Feb. 25, 1936.　　　　F. SCHIFFL　　　　2,032,184
SOUND GATE
Filed June 21, 1930

INVENTOR
FRANK SCHIFFL
BY
ATTORNEY

Patented Feb. 25, 1936

2,032,184

UNITED STATES PATENT OFFICE 2,032,184

SOUND GATE

Frank Schiffl, Hampstead, London, England, assignor to Radio Corporation of America, a corporation of Delaware Application June 21, 1930, Serial No. 462,741
In Great Britain December 4, 1929

12 Claims. (Cl. 179—100.3)

This invention relates to sound recording and reproduction as applied to talking motion picture films.

It has been found that during the passage of the photophonographic film record through the sound gate of the apparatus for reproducing the sound portion of said record, the heat sometimes causes part of the emulsion from the film to be deposited on the surface of the gate shoe with the result that the plane of the moving film is altered causing it to be out of focus with respect to the light passing through the sound portion. The emulsion so deposited on the gate shoe tends to scratch the film passing therethrough and as a consequence, the sound reproduction is impaired not only in the reproduction in a device so clogged, but also in another device by the use of the same film record.

It is the object of the present invention to obviate these disadvantages.

It is a further object of this invention to produce a sound gate in which the gate shoe will contact with a non-emulsion side of the film.

It is a further object of this invention to provide a film gate in which the emulsion side of the film will not slidably pass over any portion of the apparatus.

Another object of this invention is to produce a sound gate in which the tension of the film passing therethrough will be maintained constant at all times in order that the lateral position of the sound gate will not vary.

These and further objects of my invention will become apparent from the following specification taken in connection with the appended drawing.

In accomplishing my invention, the film is caused to follow a curved path through the sound gate by passing it over a gate shoe which contacts with the non-emulsion side of the film. The gate shoe is formed with an aperture through which is projected the light for accomplishing the reproduction of the sound portion of the film. The film is preferably guided relative to the gate by means of a pair of two-part rollers which are flanged circumferentially at their ends and one part of each of which is spring pressed toward the other in the axial direction. The gate shoe may be removably fitted in the place of the usual pressure plate of the film sound gate of the known type, while the guide rollers may be mounted on spindles carried on a frame which may be removably fitted in the place of the gate shoe of the usual type sound gate.

In accordance with one form of the invention, the film is fed through the sound gate by a pair of sprockets, the teeth of which are adapted to engage the usual perforations of the film. One sprocket is used to drive the film to, and another is used to take the film through, the sound gate. The sprocket rollers may be arranged to be driven at the same speed but that which takes the film from the sound gate may be driven through a spring driving or lost motion device so that when the driving motion power is applied to the sprocket, the take-up roller does not become effective until after the other has become effective. Thus a bight of film is formed which may be taken up by a spring compensator mechanism which will act against the non-emulsion side of the film so as to maintain the film under a constant tension. In the usual slot of the pressure plate of the sound gate may be inserted a shoe which is substantially a right angled triangular prism with its apex rounded. This gate shoe is formed with the usual aperture through which is projected the light causing the reproduction of the sound portion of the film.

In place of the usual gate shoe of the sound gate, there is fitted a frame adapted to support at each side, the spindles of a pair of two-part rollers, the axes of which lie transverse to the direction of movement of the film. Each roller is flanged circumferentially at its ends, and adjacent the flange is a cylindrical portion, while the central part of each roller is concave. The rollers are so disposed that the apex of the gate shoe projects between substantially to the common plane of the axes of the roller. Each roller is divided centrally and transversely of its axis, one part being secured to the spindle so that its flange, and consequently the edge of the film is accurately located, while the other part of the roller is slidably mounted on the spindle and is pressed towards the first part by a spring coiled around the end of the spindle and abutting at its one end against the frame and the other against the adjacent end of the movable portion of the roller. If desired, both parts of the roller may be freely mounted on the spindle and collars may be provided on the spindle to limit the motion of one portion of the roller along the axis, and also a flange on the spindle may be provided as an abutment for the spring which serves to press the two parts of the split roller together.

The rollers may be provided with flexible belts made of metal or other suitable material which will be adapted to support the film and press it firmly against the gate shoe during the reproduction regardless of the actual tension on the film itself. The said belts will only press against the marginal surfaces of the film, and therefore, will not injure the emulsion although they are not adapted to do so in any event. By the use of the belts the actual focus of the sound portion of the film can be very accurately determined.

The frame supporting the spindle of one of the pairs of rollers may be arranged to be swung out of operative position to assist in the inserting of the film through the sound gate. The framework may either swing about the axis of the stationary roller or any other suitable arrangement may be provided as desired.

The relative position of the gate shoe and the rollers in conjunction with the endless belts and the tension of the film cause the latter to follow the desired curved path, and as only the margins of the emulsion side of the film come into contact with the cylindrical rollers or the belts while the non-emulsion surface of the film passes over the surface of the gate shoe, there is no risk that any of the emulsion will be deposited on the gate shoe. Further the emulsion is not apt to be deposited upon the rollers or the endless belts due to the fact that they are not subject to the heat and the engagement is not frictional.

The gate shoe and roller frame may be either removably secured or fixed in the machine as desired under the particular circumstances.

Having thus briefly described my invention, attention is invited to the accompanying drawing in which.

Figure 1:
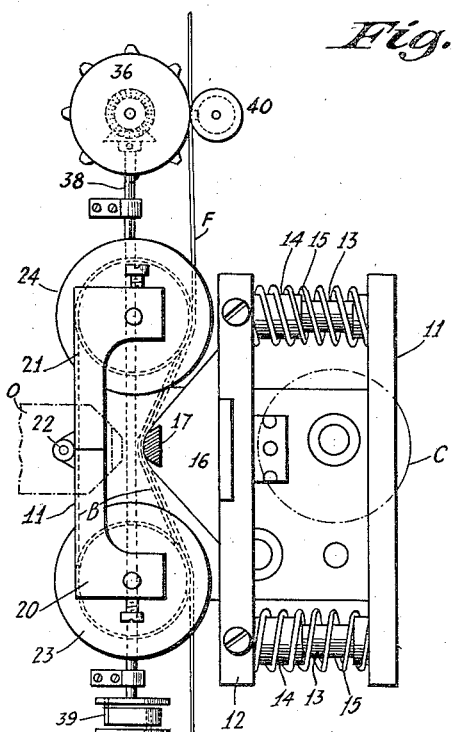
Fig. 1 is a general side view of the apparatus comprising my invention.
Figure 2:
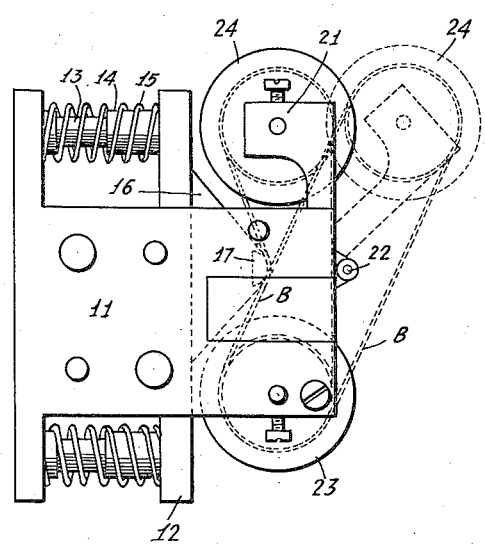
Fig. 2 is a side view of the roller frame from the opposite side to that shown in Fig. 1.
Figure 3:
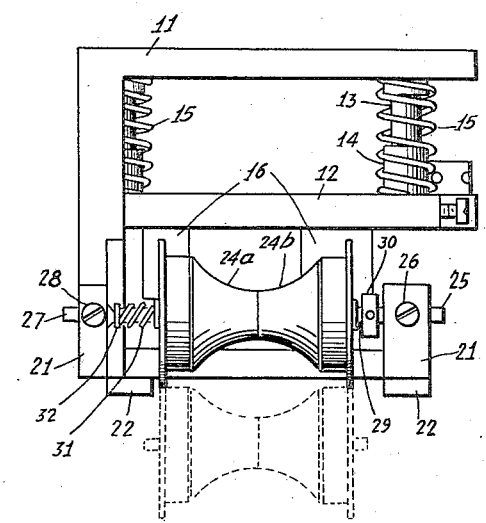
Fig. 3 is a top view showing the roller frame and guide shoe.

Particular attention is now invited to Figs. 1 to 3 inclusive, in which the same reference numeral indicates like parts. The shoe mounting frame 11 is bolted or otherwise secured to the framework of the talking motion picture machine in any appropriate manner. The shoe supporting member 12 is resiliently mounted relative to frame 11 by means of pin members 13, which are mounted upon the latter, and tubular members 14, which are mounted upon member 12. The pins 13 are adapted to slide within the tubular members 14. The mounting is made resilient by means of springs 15 which are arranged around the pins 13 and tubular members 14 as shown.

Upon the face of the shoe supporting member 12 is arranged the sound gate shoe 16. The shoe may be slidably mounted upon 12 or secured thereto in any appropriate manner as desired. The shoe 16 is provided with an aperture through which the light for accomplishing the reproduction of the sound portion of the film is projected. The aperture may be filled by a plug 17 of quartz or other transparent material as shown. This permits the shoe to have a smooth continuous surface over which the film F is adapted to be moved, as will be discussed hereinafter.

The frame 11 is provided with a projection 20 adapted to form one of the bearings for a roller 23 as shown. Mounted by hinges 22 is a second bearing member 21 adapted to provide the bearings from the roller 24. The two rollers are mounted, as will be described hereinafter, in such a manner that the apex of the shoe 16 is adapted to project practically into the line of their centers therebetween.

The bearings of the rollers 23 and 24 are provided by means of the pins 25 and 27 which are secured in the bearing members 20 and 21 by means of set screws 26 and 28. The roller shaft 29 is provided with a bearing recess at each end thereof. The rollers 23 and 24 are of two parts, for instance, 24a and 24b. As shown more particularly in Fig. 3, these two portions are adapted to be spring pressed toward each other as will now be described. At one end of shaft 29 is provided a collar 30 which is adapted to form an abutment for the end of one part 24b of the roller 24. A collar 32 is provided at the other end of the shaft 29 against which is adapted to abut a spring 31 which tends to press one part 24a of the roller 24 against the other part 24b of the roller 24.

Figure 4:
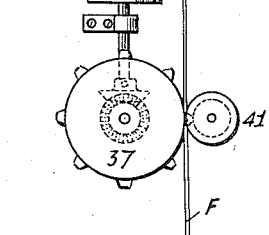
Fig. 4 is a general view of one of the rollers showing the recess for the endless belt.

Attention is now invited more particularly to Fig. 4 which shows the details of one part, 24a for instance, of the separable roller 24. Each of the roller parts are exactly the same and include a concave portion 33 and a recessed portion 34 and a flange 35. The recessed portion 34 is adapted to receive a belt of such dimension that when the belt is in position, the surface of the belt is flush with the edge of the recessed portion.

The belt B is passed around the two opposite rollers and around the apex of the shoe 16, as shown more particularly in Fig. 1. The belts B are arranged to co-act with the edges of the film F and are the only portions of the reproducing equipment which touch the emulsion side of the film.

The film is adapted to be drawn through the sound reproducing mechanism by means of the driven sprockets 36 and 37 which are driven by the shaft 38 through a spring drive arrangement 39 which is of such construction that when the pressure rollers 40 are placed in position maintaining the film F against the sprockets 36 and 37 and the movable bearing member 21 is moved into position, the resilient drive will permit the film to be moved to permit the extra amount required for the closing of the roller support 21. Any appropriate means may be provided for maintaining bearing member 21 in the closed position.

Back of the shoe 16 and inside of the shoe supporting members 11 and 12 is placed the photoelectric cell C in such a position that it is adapted to receive all of the light passed through the sound track of the film F and through the aperure 17 of the shoe 16. For supplying the reproducing light to be passed through the film F, is provided the optical system O which is of the usual type and is adapted to focus the reproducing light upon the film in the form of a very thin transverse slit of light across the sound track of the film F.

The film F is adapted to be moved as above stated through the film reproducing method by means of the sprockets 36 and 37. It is passed between the belts B and the shoe 16, the belts serving to maintain the non-emulsion surface of the film in close contact with the shoe 16 as it passes thereover. However, the non-emulsion side of the film only is adapted to slide over the shoe 16 whereas the emulsion side of the film F is in contact with only the moving belts B.

If desired the belts may be omitted and the rollers in this case would be made without the recessed portion 34 so that the edges of the film would merely be supported by the edges of the rollers 23 and 24, the tension being maintained by means of the spring arrangement 39 or by means of a compensating mechanism which will now be described, reference being had at this point to Fig. 5.

Figure 5:
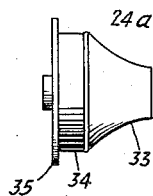
Fig. 5 is a general schematic diagram illustrating the use of a compensator or take-up mechanism.

In Fig. 5 the same general setup is provided. The rollers 23 and 24 are the same as those of Figs. 1 to 4 inclusive, and the shoe 16 is the same. The belts B may be provided or not as desired, and the driving sprockets 36 and 37 may be driven relative to each other by a similar arrangement to that shown in Fig. 1 if desired. Between the driven sprocket 36 and roller 24 is provided an idler 50 and a compensating roller 51. The compensating roller 51 is adapted to be spring pressed by means of the spring 52 as shown, to maintain a constant pressure or tension upon the film F as it passes the sound reproducing device. The driven sprocket 36 may be driven by any viscous driving means in order that any irregular motion of the driving mechanism may be eliminated with respect to this sprocket.

Having thus described my invention, attention is invited to the fact that I am not to be limited by the specific embodiment shown and described for the purpose of illustration only but by its scope as set forth and determined in the following claims.

I claim:

1. In a photophonographic sound reproducing apparatus, a shoe member adapted to support the film at the point of sound reproduction, said shoe member having a rounded surface adapted to co-act with the non-emulsion side of the film, a resilient mounting for said shoe member, and a plurality of rollers co-acting with the marginal portions of the emulsion side of the film to maintain it in close contact with said shoe member during reproduction.

2. In a sound reproducing apparatus, a photophonographic sound record, a shoe member adapted to support the film at the point of sound reproduction, said shoe member having a rounded surface adapted to co-act with the non-emulsion side of the film, a resilient mounting for said shoe member, and a plurality of rollers adapted to co-act with the marginal portions of the emulsion side of the film, said rollers being adapted to maintain the film in close contact with said shoe member during reproduction.

3. In a sound reproducing apparatus, a photophonographic sound record which is to be reproduced, means for moving said record at a constant speed, sound reproducing apparatus adapted to operate upon said sound record to reproduce the sound recorded thereon, a shoe member adapted to support the film at the point of sound reproduction, said shoe member having a rounded surface adapted to co-act with the non-emulsion side of the film, a resilient mounting for said shoe member, and a plurality of rollers adapted to co-act with the marginal portions of the emulsion side of the film, said rollers being adapted to maintain the film in close contact with said shoe member during reproduction.

4. In a sound reproducing apparatus, a photophonographic sound record which is to be reproduced, a shoe member adapted to support the film at the point of sound reproduction, a plurality of rollers over which the film is adapted to pass, said rollers being composed of two parts one of which is spring pressed towards the other to maintain the sound record in exact lateral position, and a plurality of belts adapted to co-operate with said roller portions to support the marginal portions of said film record as it is being passed over the said shoe member to maintain the film in close contact with the shoe member during reproduction.

5. In a sound reproducing apparatus, a photophonographic sound record which is to be reproduced, a shoe member adapted to support the film at the point of sound reproduction, said shoe member having a rounded surface adapted to co-act with the non-emulsion side of the film, a plurality of rollers over which the emulsion side of the film is adapted to pass, said rollers being composed of two parts one of which is spring pressed towards the other to maintain the sound record in exact lateral position, and a plurality of belts adapted to cooperate with said roller portions to support the marginal portions of said film record as it is being passed over the said shoe member to maintain the film in close contact with the shoe member during reproduction.

6. In a sound reproducing apparatus, a photophonographic sound record which is to be reproduced, a shoe member adapted to support the film at the point of sound reproduction, a resilient mounting for said shoe member, a plurality of rollers over which the film is adapted to pass, and a plurality of belts adapted to cooperate with said roller portions to support the marginal portions of said film record as it is being passed over the said shoe member to maintain the film in close contact with the shoe member during reproduction.

7. In a sound reproducing apparatus, a photophonographic sound record which is to be reproduced, a shoe member adapted to support the film at the point of sound reproduction, a resilient mounting for said shoe member, a plurality of rollers over which the film is adapted to pass, said rollers being composed of two parts one of which is spring pressed towards the other to maintain the sound record in exact lateral position, and a plurality of belts adapted to cooperate with said roller portions to support the marginal portions of said film record as it is being passed over the said shoe member to maintain the film in close contact with the shoe member during reproduction.

8. In a sound reproducing apparatus, a photophonographic sound record which is to be reproduced, a shoe member adapted to support the film at the point of sound reproduction, said shoe member having a rounded surface adapted to co-act with the non-emulsion side of the film, a plurality of rollers over which the emulsion side of the film is adapted to pass, said rollers being composed of two parts one of which is spring pressed towards the other to maintain the sound record in exact lateral position, and a plurality of belts adapted to cooperate with said roller portions to support the marginal portions of said film record as it is being passed over the said shoe member to maintain the film in close contact with the shoe member during reproduction.

9. A photophonographic apparatus including a shoe member arranged to be resiliently pressed against a flexibly supported record, and flexible means for holding said record against said member.

10. A photophonographic apparatus including a shoe member arranged to be resiliently pressed against a flexibly supported record, and means including a pair of rollers mounted at opposite sides of said member and arranged to press said record against said member.

11. Photophonographic apparatus including a flexible means for supporting a record, a curved shoe member adapted to flex a record against said flexible means, and resilient means pressing said shoe member into cooperative relation to said flexible means.

12. Photophonographic apparatus including a pair of rollers, flexible means on said rollers adapted to support a flexible film, and a shoe member resiliently urged toward said flexible means for placing a film into contact therewith.

FRANK SCHIFFL.